United States Patent Office 3,473,367
Patented Oct. 21, 1969

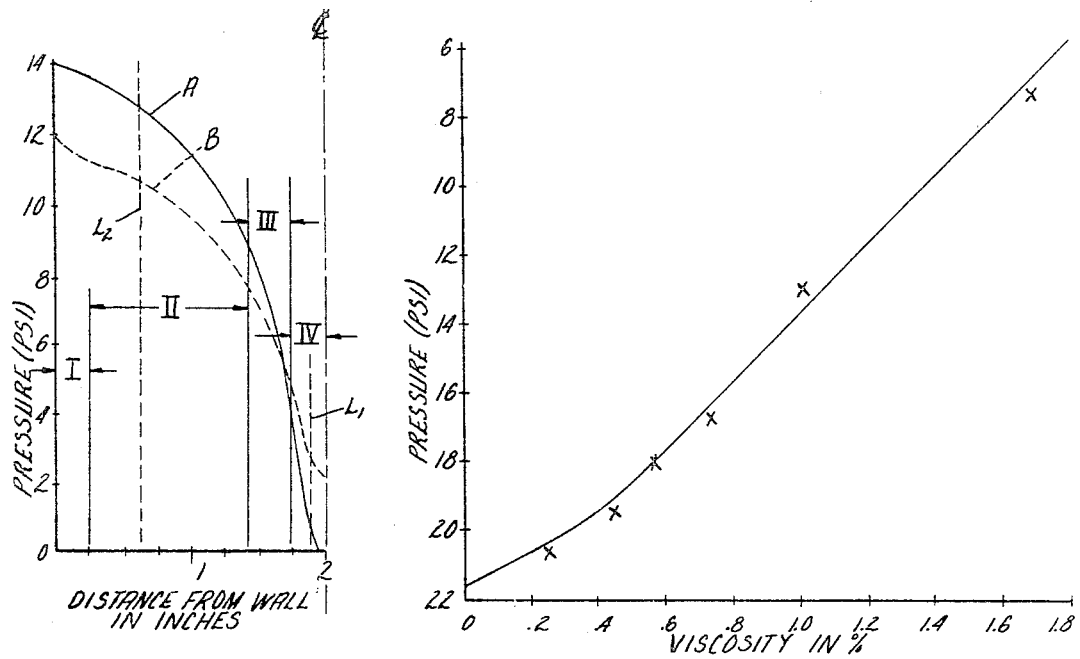
Fig.1
Fig.2
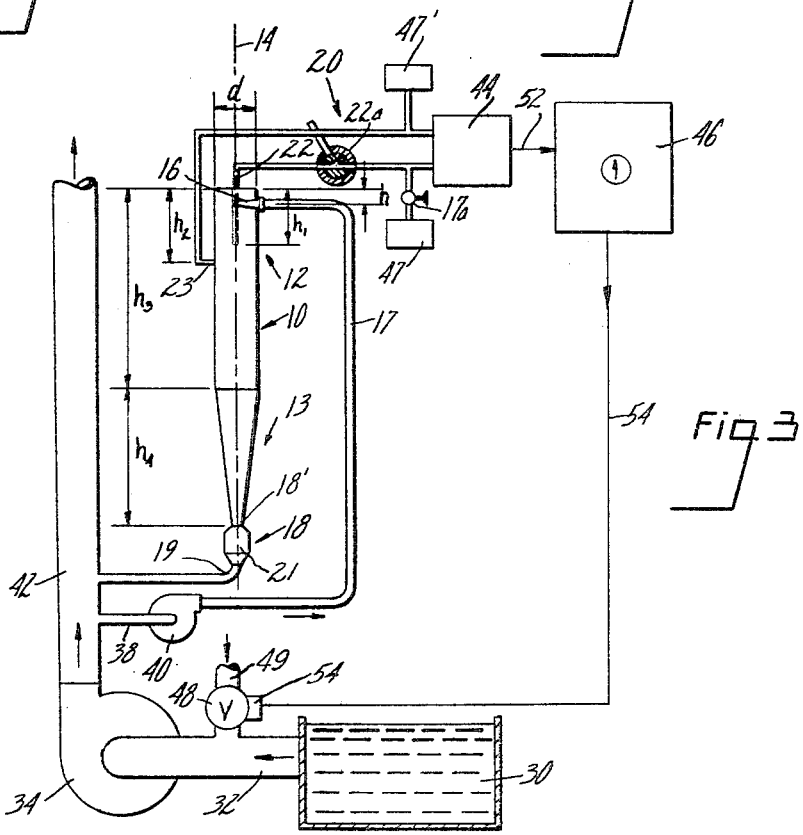
Fig.3

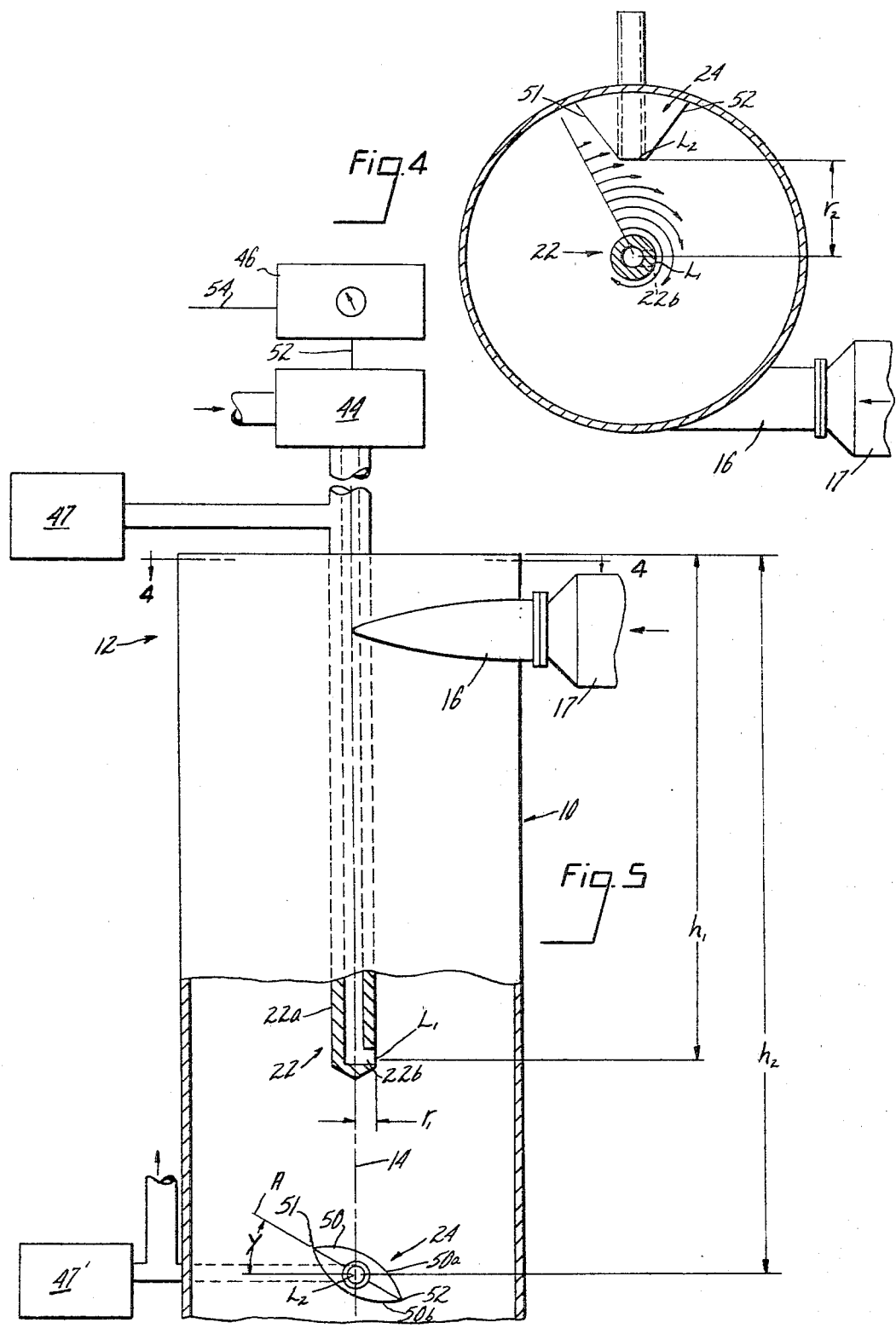

3,473,367
VISCOSITY SENSING MEANS AND RELATED
SYSTEMS
Edwin Parker Troland, Hingham, and George L. Nelson, Westwood, Mass., assignors to Bird Machine Company, South Walpole, Mass., a corporation of Massachusetts
Filed May 4, 1965, Ser. No. 453,222
Int. Cl. G01n 11/02; D21f 7/06
U.S. Cl. 73—54
19 Claims

ABSTRACT OF THE DISCLOSURE

Viscosity sensing device measures the dynamic condition of liquid in a closed vortex chamber at a point to obtain a viscosity measurement due to the shear stress between radially adjacent circular flow elements of the vortex. A pump ensures a constant substantial pressure drop across the chamber, enabling high resolution of the viscosity readings down to low viscosities and useful with flow lines subject to varying pressure. Two spaced sensing points with reverse relationships of pressure to viscosity obtain additive effects for increased sensitivity.

---

This invention relates to apparatus for sensing the viscosity, and hence the consistency, of liquids, including solutions and suspensions, wherein the individual components of the liquid may have similar specific gravities.

It is a prime object of this invention to provide viscosity sensing means adapted to control the consistency of dilute liquids within very narrow tolerances.

Another object of the invention is to provide a viscosity sensing means capable of accurate operation over a wide range of viscosities.

Another object of the invention is to provide a viscosity sensing means which, while highly sensitive to changes in viscosity or consistency, is compact in size, simple in piping arrangement and clean in operation and can employ conventional sensing devices and instrumentation.

Another object of the invention is to provide automatic control systems for flow systems, and a particular object is to provide automatic control systems for paper making to enable improvement in the uniformity and quality of paper products, and the cost of producing them.

Another object of the invention is to provide a viscosity sensing means which can efficiently sample fluids directly from high pressure systems.

Still another object of the invention is to provide a viscosity sensing means that can operate accurately despite changes in the absolute pressure, temperature or velocity of the liquid.

And yet another object of the invention is to provide an improved viscosity sensing means that is capable of use with closed systems, and capable of returning sampled fluid to such systems.

Other features, advantages and objects of this invention will be apparent to those skilled in the art from the following detailed description of preferred embodiments of this invention, together with the accompanying drawings wherein:

FIG. 1 is a diagrammatic plot of pressure against distance from the walls of a vortex chamber for two liquids having different viscosities;

FIG. 2 is a diagrammatic plot of pressure differential against consistency of paper stock, as can be produced from a pair of pressure sensitive taps in a vortex chamber;

FIG. 3 is a diagrammatic representation of a system embodying the present invention;

FIG. 4 is a cross-sectional view of the vortex chamber of a preferred embodiment of this invention taken on line 4—4 of FIG. 5 and showing diagrammatically the velocity gradient across the chamber;

FIG. 5 is a side view of the vortex chamber of FIGS. 3 and 4, with part broken away.

Figure 6:
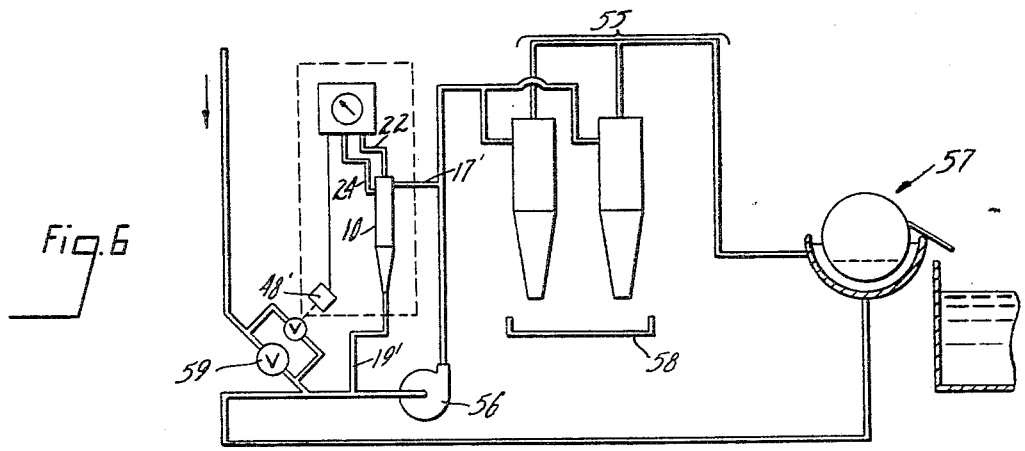
FIGS. 6, 7, 8 and 9 are diagrammatic views of other flow systems according to the present invention.

Initially, it should be noted that wherever the term "liquid" is used herein, it is used generically to include suspensions in a liquid, and wherever the term "vortex chamber" is used, it concerns a chamber for circular flow of liquid in which the liquid at an inner radius is permitted to rotate faster than liquid at an outer radius.

According to one aspect of the present invention it has been discovered that a closed vortex chamber and radially localized means within the chamber for responding to the dynamic condition of the vortexing liquid, form an improved means for sensing viscosity of liquids. Thus a pressure drop across such a closed chamber and a velocity profile of the vortex can thereby be achieved which enable very sensitive and stable viscosity indications to be obtained.

According to another aspect of the invention dynamic changes in vortexing liquid advantageously can be sensed by direct liquid pressure responsive means.

According to another aspect of the invention, it has been found that at different predetermined positions within vortexing liquid, opposite changes in the dynamic condition of the vortexing liquid occur with a given change in viscosity; and by measuring the difference in the dynamic responses obtained from two such sensing positions a particularly effective viscosity sensing means for many applications is achieved.

These and numerous other important aspects of the invention will be explained in the following description.

In the preferred embodiment to be described, liquid pressure sensing means are employed to sense the dynamic condition of the liquid in a vortex chamber with the pressure sensing position being radially localized so that the dynamic condition peculiar to a given radius is sensed. Thus, in the case of a liquid filled tap line, which is a very simple means for detecting liquid pressure, the tap opening may be ⅛" in diameter and directed substantially radially. Its radial orientation, in addition to radially localizing the sensing region, also has the advantage of being directed perpendicular to the flow. Thus the dynamic condition of the liquid for a given vortex chamber configuration and predetermined inlet and outlet conditions can be indicated by a probe that is responsive to liquid static pressure.

Referring now to FIG. 1 there is shown a diagrammatic plot of the gauge pressure for tests of two paper stocks of different viscosities A and B, produced by traverse of the vortex chamber by a radially directed tubular probe, from the wall of the vortex chamber to its center line.

There is first a region I near the wall element in which the pressure reading of the liquid element may be dependent to a significant degree upon the friction qualities of the wall element. As indicated by the diagram, the higher viscosity stock B can produce a lower liquid pressure reading than stock A.

There is secondly a region II adjacent region I in which a higher liquid pressure reading also results for the lower viscosity stock. This is one of the presently preferred locations for a liquid pressure reading according to the invention.

There is thirdly a region III located inwardly from region II in which the curves cross. This can be regarded as a transition region in which the liquid pressure readings are ambiguous.

There is fourthly a region IV in the vicinity of the center line of the vessel in which a higher liquid pressure reading results for the higher viscosity stock.

It has been found that regions II and IV provide advantageous locations for a pressure tap, by means of which the dynamic condition, and hence the instantaneous degree of slippage and the viscosity of the liquid can be sensed. The accuracy of the viscosity determination and the avoidance of side effects due to supply pressure change, flow change, temperature, etc., is improved by employing a reference tap in the flow system, and sensing the difference in pressure between the two taps. Preferably, according to the invention, one tap is located in each of the regions II and IV.

To illustrate, a pressure tap located at $L_2$ in region II gives a change in pressure of about 3 p.s.i., from 13 to 10+, for a change from the consistency of stock A to that of stock B. Similarly, a pressure tap located at $L_1$ in region IV gives a change of about 3 p.s.i., from 0+ to 3, for a change from the consistency of stock A to that of stock B. However, the pressure differential between points $L_2$ and $L_1$ changes from the amount $L_2-L_1=13-0^+=12^+$ for stock A to $$L_2-L_1=10^+-3=7^+$$

for stock B, a change considerably larger than for either tap alone. This greater spread can result in significantly greater accuracy in measurement, and can permit operation down to very low consistency values.

It should be appreciated that the boundaries of the various sensing regions vary, depending upon the particular geometry of the vessel selected, its piping, etc. Furthermore, the location of the boundaries of the various regions will usually be different for different places along the axis of the chamber, and not all places along the chamber length may be suitable for obtaining meaningful results. Nevertheless, suitable sensing positions can easily be determined for a given configuration and operating condition by traversing the closed chamber with a pressure probe.

To be more specific about the location of the taps, in the case of a chamber having a tangential inlet for creating the vortex, the precise location of the inlet may be subject to turbulence due to the entering stock, particularly with regard to region I which lies close to the chamber wall. Additionally, the vortex in many cases is imperfectly formed at this location. Accordingly, it is often preferred not to employ a probe at this location.

On the other hand, as liquid proceeds in the direction of the outlet, the length of time for which the liquid is subject to the effect of its own viscosiy increases, and this has a tendency to decrease the pressure readings and lessen the accuracy with which they reflect the viscosity.

In the case of the tap of region IV, it is advantageous, and in many instances absolutely necessary for the probe to be in the vicinity of the inlet; generally the preferred location for this tap is spaced no further along the axis from the inlet than twice the maximum diameter of the chamber.

In this connection, it should be understood that the operation of the invention is not time dependent, hence, when the disturbances at the inlet are not great, the pressure reading can be taken at the very region immediately following the formation of the vortex.

Also, for the region IV tap, it is preferred, in cases where the fluid may contain entrained air, for the tap to be spaced slightly from the center line, to avoid the effects of an air core if one should occur.

In the case of a tap in region II, or in some instances region I, the tap can advantageously be spaced further, in the direction of the axis, from the inlet than the region IV tap. Generally, it is presently preferred that the region II tap be at no greater distance than about four times the maximum diameter of the chamber.

It is often advantageous to employ an axially elongated vortex chamber, to enable the establishment of a stabilized vortex and provide an optimum location for the sensing positions between inlet and outlet. For instance such a chamber may be employed in cases where an as-wide-as possible range of consistencies is desired, and conventional chamber designs are to be utilized. As a general rule, for such chambers, it is advantageous to locate the pressure taps closer, in the direction of the length of the chamber, to the inlet than to the outlet.

The invention is capable of use with the chamber of a conventional cyclone separator such as is used for the separation of fractions of different specific gravity. Unlike such separators, however, the present invention does not depend upon separation on the basis of specific gravity difference, and indeed can operate very satisfactorily where all constituents of the fluid have exactly the same density. Also, it is presently preferred not to have a central outlet from the large or inlet end of the chamber, which represents a difference in structure from that of cyclone separators, which require an outlet in that region for low density materials.

According to the invention, the vortex as produced by a substantial pressure drop across the closed vortex chamber amplifies the instantaneous internal shear of the liquid into predominance relative to all other effects, and enables this effect to be indicated by a direct pressure reading. To achieve this result, it is necessary to use the closed chamber, i.e., a chamber not open to the atmosphere, and generally it is necessary that the pressure drop be of the order of 10 p.s.i. or above, and in many cases substantially above. Advantageously the vortex should generate centrifugal forces in excess of about 100 times the earth's gravitational force, and preferably substantially greater.

To give a somewhat idealized explanation of the nature of the invention, let us consider first a cross-section of a free vortex of a theoretically frictionless fluid. The liquid can be considered to be made up of cylindrical laminar layers or elements.

Due to their varying distances from the center and the original kinetic energy of each fluid particle before entering the vortex, these layers tend to rotate at higher speeds, the closer they are to the center. Correspondingly, the layers have lower static pressures the closer they are to the center. In such a vortex there is continual slippage between adjacent layers.

Let us consider on the other hand a fluid having a substantial viscosity. The viscosity lessens the instantaneous slippage, hence the static pressure at an inner layer will be higher because the liquid in the vortex will never have reached the velocity of a theoretical frictionless liquid. Also, the static pressure of an outer layer will be lower.

Needless to say, this is an incomplete explanation that ignores other effects, which in slow speed vortexes can predominate. But, with vortexes as can be produced in closed chambers, locations are found to exist in the chamber in which the effect of internal shear is a clearly predominant, determining factor for the dynamic condition of the liquid, and hence pressure readings become an indication of the viscosity.

As mentioned above, to increase the significance of the pressure reading, it is advisable to employ a reference tap in the fluid system, to limit the effect of an over-all pressure change across the vortex chamber. This tap could be outside of the vortex, e.g. in the inlet line. Advantageously, however, this second tap is located in the chamber and, as previously indicated, it is presently preferred and very advantageous to locate a first pressure tap in a position in which increase in pressure indicates increase in viscosity and another in a position in which increase in pressure indicates a decrease in viscosity. For any given flow system and chamber design, the optimum positions can be determined by testing various locations.

Referring to FIG. 2, there is a diagrammatic plot of pressure differential in p.s.i. against consistency of paper stock, as can be obtained using bleached sulphite paper stock that is diluted to varying degrees.

Such a pressure differential is taken from two pressure taps, one in region II and one in region IV of the diagram in FIG. 1, in a vortex generated with a tangential inlet and a pressure drop on the order of 40 p.s.i. applied across a conventional cyclone separator with the low density outlet blocked off.

The present invention allows accurate determination of the consistency of certain paper stocks in the range far below 1%, and on the other hand is very effective at consistencies up to at least 2½%. Also it has been demonstrated that for a given consistency stock, a substantially constant consistency reading can be obtained despite very substantial changes in the pressure and the flow of stock in the line being sampled.

With reference now to the drawings, and more particularly with reference to FIG. 3 thereof, a preferred embodiment of the viscosity sensing device of the present invention comprises in the first instance an atmospherically sealed chamber 10. The chamber is hollow as shown in FIG. 4, is of circular cross-section in all planes extending at right angles to axis of rotation 14 therewithin, and is adapted to contain a pressurized liquid. An inflow means in the preferred form of nozzle 16 connected to a pipe 17 is adapted to introduce a high speed stream of pressurized liquid into the chamber, tangentially to the circular cross-section of the chamber. Outlet means 18 are also provided in the chamber to accept the discharge of the pressurized liquid from the chamber. Finally, pressure sensing means 20, including at least one pressure sensitive tap 22 or 24 (FIG. 5), are provided which are exposed to the liquid vortex in the chamber and are adapted to respond to pressure changes thereby to serve as a means for detecting the dynamic condition of the liquid at a radially localized point. As previously explained this indicates the degree of viscous sheer between radially adjacent elements in the vortex chamber.

In the preferred embodiment of this invention, the chamber 10 is elongated and comprises a modified hydrocyclone, the inlet means being positioned at one end 12 thereof, and the outlet means being axially positioned at the other end 13 thereof. Also, in the preferred embodiment, the outlet at end 13 is the only discharge outlet and is adapted in size to establish a vortex of substantial radial thickness, while large enough to accept the entire discharge, including impurities, of pressurized fluid from the chamber. Preferably the outlet flow area is so sized, relative to the remainder of the system that the chamber is substantially entirely filled with vortexing liquid with the air core being no larger than about the size of an ordinary pencil.

An effective embodiment, specifically, is a hydrocyclone having a 4 inch diameter, $d$, cylindrical portion approximately 2 feet in length, $h_3$, and a conical portion tapering down to a 1 inch diameter at the outlet end and having approximately a length $h_4$, of about 1 foot, also having approximately a ⅝ inch diameter inlet nozzle 16, with, e.g. its center line spaced ⅞ inch from the top of the chamber 10. Following the 1 inch outlet constriction 18', a mixing chamber 21 is advantageously provided to ensure that any separated air is mixed back with the stock and removed.

A pump 40, capable of producing a pressure in excess of 20 p.s.i. is arranged to intake fluid from a flow pipe 42, and by means of piping 17 larger than nozzle 16, direct fluid to the chamber. The outlet 18 has means connecting conduit 19, which returns the fluid to the pipe 42.

The liquid pressure sensing means 20 may be any pressure sensing device which is adapted to sense pressure changes and to send out a signal, in response thereto. In the preferred embodiment of this invention, however, the pressure sensing means comprises a tap line forming a liquid linkage between a tap point in the vortex chamber and a differential pressure device adapted to measure pressure differential between the point and a reference point in the fluid system. The differential pressure device is capable of responding to pressure differential substantially in excess of 1 p.s.i. and through an appropriate control system is adapted to operate a valve in response to sensed changes in such differential pressure.

Advantageously, purge means 47 and 47' are employed, supplying clear water to the lines at slightly higher pressure than that of the chamber 10, so that a gentle back flow into the chamber is provided to prevent clogging of the lines.

In the preferred embodiment the pressure sensing means comprises two liquid filled sensing taps 22 and 24, located at positions $L_1$ and $L_2$ and a differential pressure cell 44. A controller device 46, e.g. pneumatic or electric is operated by cell 44 and controls a remotely operable valve 48, e.g. by pneumatic or solenoid operating means. Position $L_1$ is located at a point close to the axis of rotation, e.g. at the location shown in FIG. 3, $h_1 = 5¾$ inches, $r_1 = ¼$ inch. The second position $L_2$ is located further from the axis of rotation than the first position, $L_1$, preceding the conical end of the chamber preferably as shown, $h_2 = 8⅜$ inches, $r_2 = 1¼$ inches (FIG. 4).

A suitable differential pressure device 44 is a pressure cell manufactured by the Barton Instrument Corporation of Monterey Park, California, Model 273 A. This cell is connected to the liquid filled lines 22 and 24 that serve as pressure taps. The output of this cell is a pneumatic signal whose value is determined by the pressure differential between lines 22 and 24.

A suitable controller 46 is a Model 40 "Stabilog" controller manufactured by the Foxboro Company of Foxboro, Massachusetts. It receives the pneumatic signal output 52 of pressure cell 44 and ocmpares that signal to a predetermined setting value. Depending upon whether the signal is greater or less than the setting value a pneumatic control signal 54 is directed to control valve 48.

A suitable means 40 for maintaining a pressure drop across the vortex chamber is a centrifugal pump manufactured by Goulds Pumps Inc. of Seneca Falls, New York.

In a typical operational setup, the viscosity sensing device is positioned in a system as is shown diagrammatically in FIG. 3, which first of all comprises a source of liquid 30 connected by a feed line 32 to a main pumping station 34. The pump 34 pumps the liquid through a pumping line 42 which typically leads to processing apparatus (not shown). A tap line 38 is provided leading from the pumping line to the pump 40, thence to the inlet means 16 and the chamber 10 of the viscosity sensing device. At the outlet means 18 of the chamber 10 a return line 19 is provided extending back to the pumping line 42 at a point which is preferably adjacent, and preferably downstream of the point at which the tap line 38 extends from the pumping line 42, thus to provide a susbtantially constant pumping head in the chamber 10 regardless of pressure changes in the main line 42.

A liquid dilution line 49, through which is pumped diluting liquid comprising a component of the liquid being measured, is provided leading to the feed line 32. The dilution line is valved by valve 48.

In operation the liquid is pumped from the pumping line to the inlet means 16 of the viscosity sensing means, preferably with a pressure increase of about 30 p.s.i., and thence into the chamber 10. After the liquid takes on a vortex motion, the pressures at points $L_1$ and $L_2$ (or either of them) are indicative of the amount of slippage between radially adjacent layers. The pressure sensing means 20 sends out a signal based on the differential between the two pressures, which differential pressure decreases with increasing viscosity of the liquid. The signal of the pressure sensing means actuates the controller 46 which controls the dilution valve 48, opening it for greater dilution as viscosity increases and vice versa.

Because of the closed design and other features of the present invention, extremely high velocities can be attained, thus maintaining pressure drop and accuracy with highly dilute liquids. Using a hydrocyclone of the hereinbefore set forth preferred dimensions with a pressure of 30 p.s.i., flow between 30 and 0 gallons per minute, forces in excess of 200 times gravity are attained. Under such conditions concentrations of pulp stock having a concentration of much less than 1% and up to 2½% may be accurately measured and tests have indicated that the error is within ±0.02% of true consistency.

Needless to say, the problem of exposure of liquid to the atmosphere is also overcome by this invention.

For a wide range application a pressure cell capable of detecting a pressure differential in excess of about 1 p.s.i. is preferred, and in the case of employing a single pressure sensitive tap, similarly the tap is preferably capable of detecting pressures in excess of 1 p.s.i.

Referring to FIG. 3 the operation of the device can be modified to operate with only one probe by closing purge valve $17a$ and turning 3-way valve $22a$ to open the corresponding line of the pressure cell to atmosphere. Thus the cell 44 will read the "gauge" pressure of probe 23, with probe 22 having no effect.

On the other hand, certain aspects of the invention may be advantageously employed without using other aspects of the invention. Thus, in certain instances, for instance where the accuracy requirements are not too rigorous, pressures and pressure differentials of reduced values may be employed. Similarly differently shaped vortex chambers, such as axially shortened chamber configurations may be tailored to specific applications.

One particularly advantageous arrangement for the invention is with a flow system which employs a high pressure pump. With such a system pump, and appropriate connections, it is not necessary to use the booster pump 40.

The arrangement of the pressure taps can affect the size and sensitivity of the readings, but there are instances in which various shapes of the pressure taps and relationships to the flow can be employed. For instance, simple metal tubing can extend from the side walls to the desired locations, with various alignments of the tube openings.

It has been found, however, that very sensitive readings can be obtained with the axis of the openings directed substantially radially of the vortex chamber, as shown in FIG. 4. Besides giving sensitive readings, such alignment acts to minimize the chance of clogging the taps with solid particles, and enables the use of a relatively gentle back flow of purging liquid from sources 47, 47' into the chamber.

Furthermore, it is found necessary in some instances, in order to obtain the desired sensitivity, that the tap structure be constructed and arranged in curved or streamlined form to minimize the disturbance of the liquid. In this connection, referring to FIGS. 4 and 5, it is presently preferred that tap 22 closest to the axis of the chamber be formed by an axially arranged tubular member $22a$ extending through the top of the chamber 10, and having an elbow passage $22b$ extending radially and ending in an opening whose axis is radially disposed. It is advantageous, both from the point of view of simplicity and of minimizing disturbances, that the tubular member $22a$ have an outer radius equal to the radius of the desired location of tap opening $L_1$, and furthermore that the opening be immediately adjacent the lower end of tubular member $22a$. It will be observed that the outer curved surface of tube 22 is generally aligned with the direction of movement of the vortexing liquid, and hence permits smooth flow.

With regard to tap $L_2$, it is advantageously formed by a passage extending radially through a streamlined member whose angle of attack relative to the liquid is zero or very small. Thus, where the liquid in the vortex travels in helical paths inclined at an angle Y of 30° to the transverse extent of the chamber, it is advantageous to arrange the axis A of the streamlined member at the same angle, as shown. Furthermore, it is advantageous that the streamlined member 50 have its maximum radial dimension about equal to the distance of tap point $L_2$ from the chamber wall, that the streamlined cross section be convex on both sides $50a$, $50b$ with no lift capability, and that the leading and trailing edges 51, 52 of the streamlined member diverge in the direction of the chamber wall, all as shown in FIGS. 4 and 5.

With regard to the general construction of the device, the location of the inlet immediately adjacent one end of the chamber 10, employing a single outlet, and spacing the outlet substantially from the inlet, is presently preferred from the point of view of simplicity. Furthermore, this arrangement is adapted to limit separation of the various constituents of the fluid if they should have differing densities. Nevertheless, and in particular where the constituents have the same density, it is possible to employ more than one outlet and even to locate an outlet pipe near the inlet of the closed chamber, while still obtaining at least some of the benefits of the invention.

It is also possible to employ more than one tangential inlet, or to use mechanical devices to assist in the initial formation of the vortex.

Further aspects of the invention lie in certain flow systems which, by use of consistency regulators, enable improved operation of paper making equipment. These systems are closely related to each other, and to the viscosity sensing device per se because wide range of sensitivity and sensitivity of the device to low viscosity are required and in important instances it is essential that the sensing device of the invention be employed in order to realize the benefits of the overall systems of the invention.

Referring to FIG. 6, there is shown, in general, a flow system in which, apart from the consistency regulator itself, there exist two points between which the pressure drop is held constant and at a substantial level, e.g. in excess of 20 p.s.i. More specifically, FIG. 6 shows a bank of hydroclone cleaners 55 which receive an input of stock from a constant head pump 56 capable of generating an increase in pressure of 40 p.s.i. A thickener means 57, e.g. a decker as used in the production of paper pulp, is arranged to receive the light weight constituents, while the heavy constituents are directed to a tray 58. A portion of the effluent from the thickener is directed to the intake side of the pump 56, serving as a make-up addition to the main stream of fluid being cleaned. The main stream is controlled by gross control valve 59 and parallel remotely operated valve 48', which is controlled by the viscosity sensing device described above, which employs the pressure drop of pump 56 and requires no booster pumps. The inlet 17' of the device is drawn from the discharge line of pump 56, while the discharge of the device is directed through line 19' to the intake side of the pump.

It will be appreciated that there are numerous machines, of which the hydroclone cleaners 55 and the decker 57 of FIG. 6 are examples, in which best operation is obtained when the viscosity is controlled to a constant value, and the invention of FIG. 6 offers a substantial improvement in the operation of such systems.

It is to be observed that in this embodiment the consistency regulator controls the flow of stock itself and not the conventional addition of dilution liquid.

Figure 7:
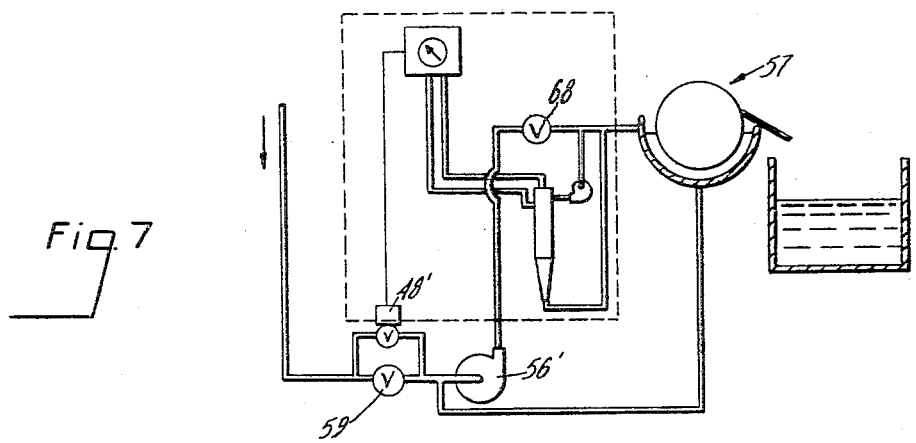

Referring to FIG. 7, there is shown an embodiment similar to FIG. 6, but in which the consistency regulator valve 48' and a second flow valve 68 cooperate to control the supply directly to a thickener. The advantages offered by such a combination as this are increase in efficiency and simplification of the control of the thickening process by reducing the number of variables. The pump 56' and the flow system are subject to pressure fluctuations, and the stock being thickened is subject to variations in consistency. Each variable directly affects the loading of the thickener, and each affects the other, making it difficult to maintain optimum conditions at the thickener. In accordance with the embodiment of FIG. 7, however, it becomes possible to maintain consistency constant despite adjustment of valve 68, so that both pressure and consistency become capable of independent and accurate control.

According to a different aspect of the invention it is found that a closed paper stock consistency sensing device capable of being filled with stock and capable of sensing low consistencies, in combination with a special arrangement for sampling and returning the flow, offers an improved means of monitoring and controlling the paper stock in its final stage before flowing onto the paper machine wire.

Figure 8:
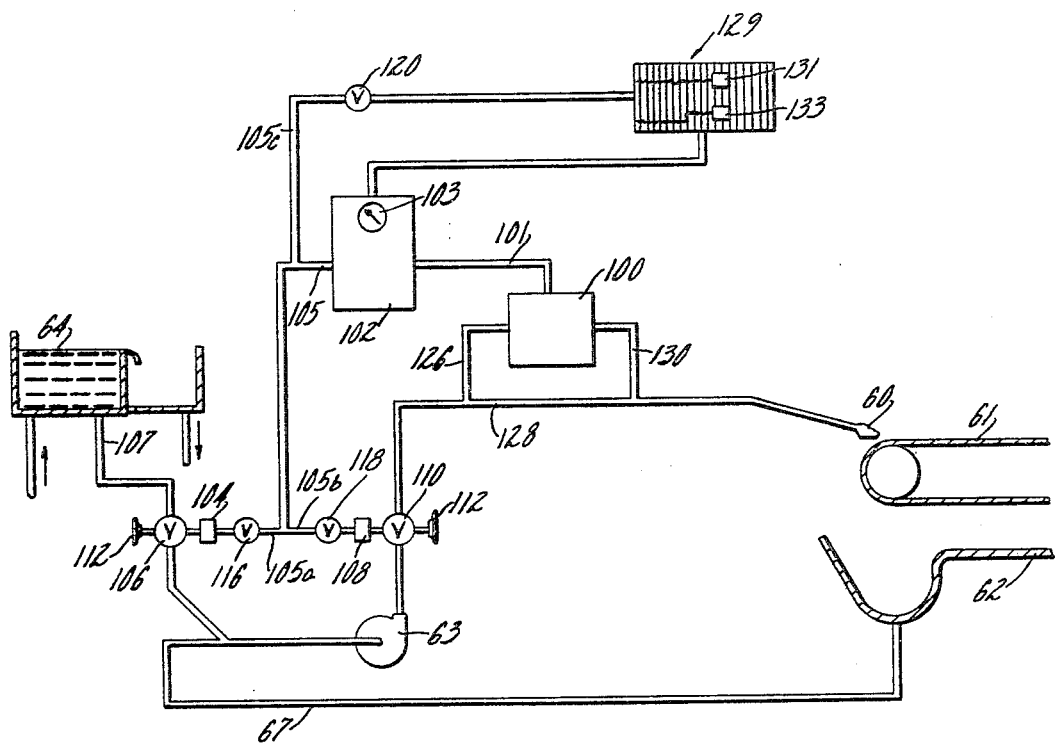

Referring to FIG. 8 a sample line 126 continuously withdraws a sample of the final paper stock from the stock line 128 between the stock pump 63 and the forming wire 61. This stock is passed through the closed sensing device 100, and then flows by a return line 130 to the main stock line 128 between the stock pump 63 and the forming wire 61. The sensing device is adapted to produce a continuing indication of the consistency of the stock, and, because of the features just described, the consistency indications are relatively unaffected by pressure and velocity variations in the stock line. Accordingly, despite the low consistency of paper stock that is required by the forming wire, in the range of about .2 and 1% fibers to water, and despite adjustments in the flow that must be made during operation, it becomes possible to record the final consistency of the stock, or to direct such information to a computer which can control the operation of the entire paper machine.

Referring still to FIGURE 8, three alternative modes of employing the consistency data produced by sensing device 100 will be described. For these embodiments a controller 102 having a setting means 103 is provided to receive the signal input 101 from the sensing device 100, which may for purposes of illustration be a pressure or electrical signal. Controller 102 has an output line 105 which carries a signal indicative of the degree the actual consistency varies from the setting.

For the various modes of operation to be illustrated, output line 105 can be an air pressure line having three branches 105a, 105b and 105c, each having a stop valve 116, 118, 120 respectively.

Branch 105a connects to an air pressure responsive valve operator 104, connected to valve 106 located in the line 107 from the stuff box (valve 106 also having a handwheel 112 for manual operation). The pump 63 receives undiluted stock from line 107 plus makeup water from line 67, fed by the wire pit 62 of the paper machine.

Branch 105b connects to a similar air pressure responsive valve operator 108, connected to a valve 110 located in the main stock line 128 downstream of the pump (valve 110 also having a handwheel 112 for manual operation).

Branch 105c from controller 102 leads to a recorder 129. As shown the recorder has one recording head 131 for recording air pressure on line 105 and a second recording head 133 connected directly to the controller, for recording the consistency setting of the controller.

For one mode of operation valves 116 and 118 can be closed, valves 106 and 110 can be manually adjusted, and valve 120 can be open. As stock flows through main line 128 to the head box 60 and on to the forming wire 61 a fraction of stock flows through sample line 126, is sensed, and is returned along line 130 to the main line. The consistency signal along line 101 is compared by the controller to its setting, and the air pressure on controller output line 105c, indicative of the difference, if any, between the consistency signal and the setting, controls the recording head 131 whereby the difference is recorded on a chart. Simultaneously, recorder head 133 can record the setting.

For a second mode of operation valves 120 and 118 can be closed, valve 110 remaining subject to manual operation, and valve 106 subjected to the control of controller 102, by air pressure on branch line 105a and responsive valve operator 104. Thus, as the consistency indication of device 100 exceeds the setting the air pressure in line 105a will change so as to correspondingly partially close valve 106. With valve 110 setting remaining constant and the pump 63 operating steadily, then, because of the throttling down of valve 106, a greater proportion of the pump intake demand comes from the makeup line 67, thereby producing a more dilute mixture at the output of the pump. Similarly when the consistency reading is lower than the setting, valve 106 is correspondingly opened, a greater part of the pump demand is filled by stock from stuff box 64, and the final consistency is raised.

In this mode the tonnage rate of the paper machine, that is the rate of passage of fibers through the slice of the head box, can be adjusted by merely adjusting valve 110, varying the total fluid flow, the system maintaining the consistency constant.

In the third mode to be described valves 116 and 120 are closed, valve 106 subjected to manual adjustment, and valve 110 operated by controller 102. A constant setting of valve 106 will ensure a substantially constant tonnage rate, while, by automatic adjustment of the total fluid flow, the consistency at the head box will be maintained constant.

For either modes 2 or 3 valve 120 may be left open and the recorder 129 can operate without loss of efficiency of the automatic regulation of consistency of the stock.

It is true that at least some of the advantages of this final stock consistency sensing arrangement may be obtained regardless of the mode of operation of the sensing device itself, so long as the device forms part of a closed, fluid-filled system and has the capability of measuring consistencies in the operating range of the particular paper making machine that is involved. However, it is to be understood that the shear generating principle of a vortex, and the sensing of the dynamic condition of fluid in the vortex, as well as the numerous other preferred features of the sensing device described above in connection with FIGS. 3–5, enable particularly wide application of the principle, and particularly close control of the paper making process.

Figure 9:
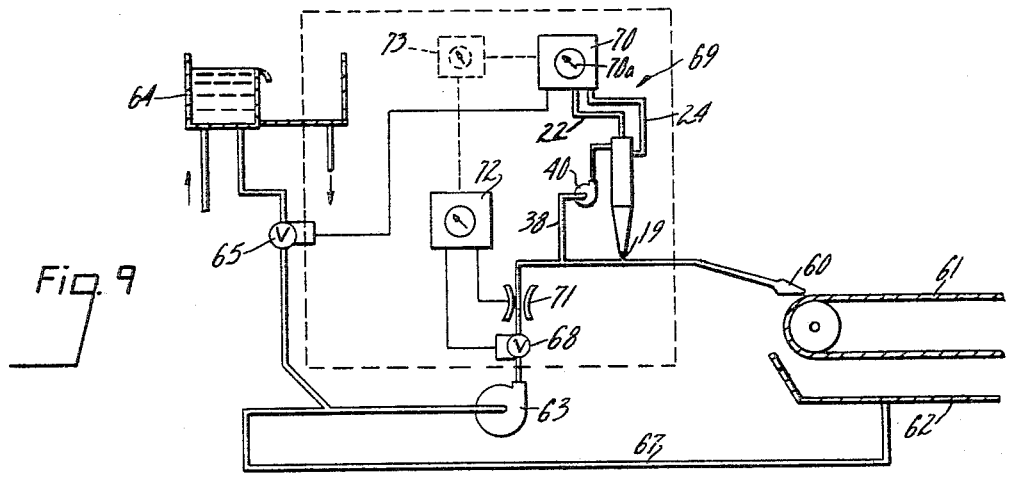

Referring now to FIG. 9, there is also shown in a diagrammatic manner a paper making machine head box 60, a Fourdrinier wire 61, a wire pit 62, a fan pump 63, and a stuff box 64. A remotely operable throttle valve 65, called the "stock" valve, controls the quantity of stock from the stuff box 64 to the intake of pump 63. A line 67 from the wire tray makes up the remainder of the pump demand. A second remotely operable throttle valve 68, called the "flow" valve, controls the quantity of flow from the pump to the head box 60. According to the invention, a unique control system employs a consistency sensing device 69, a consistency controller 70 responsive to the sensing device to operate stock valve 65, a flow meter 71, and a flow controller 72 responsive to the flow meter to operate flow valve 68.

Preferably, the consistency sensing device is constructed similar to the device of FIGS. 3–5, and has a sampling line 38, a booster pump 40, a vortex chamber, pressure taps 22, 24, and a line 19 returning the sampled stock close to the point from which it is taken. The consistency controller 70 (which can comprise the identical pressure cell 44 and the controller 46 of FIG. 3) measures the pressure differential between taps 22 and 24 and thereby obtains a reading of the consistency of the stock in its finally diluted state, immediately before reaching the head box. This reading can be transcribed to a recording chart for use in analyzing the operation of the system, and simultaneously it can operate stock valve 65 to control the consistency at a pre-established level which, because of the accuracy of the sensing device, can be very accurate. An adjustable setting means 70a (e.g. the set point of the Foxboro "Stabilog" controller mentioned above) is provided to change the level of consistency, if desired. This consistency regulator or controller 70 can be employed in addition to a second regulator that controls the consistency in the stuff box, regulator 70 serving to correct small variations, and, as well, to take over complete control if the stuff box regulator fails or if the incoming stock to the stuff box is more dilute than the control point set on the stuff box regulator.

Further, according to the invention, it is realized that the flow controller 72 and consistency controller 70 can jointly control the system to achieve better quality and lower cost of paper being produced. For this purpose a product controller 73 is provided capable of receiving the set point of quantity C (consistency) from the consistency controller 70 and the set point of quantity Q (flow rate) from the flow controller 72 and maintaining the product of C and Q (i.e. the tonnage rate) at any set value. The product controller can be adapted to receive manual changes in the set value of C×Q. The change in the set value of C×Q can be made keeping either the C or the Q set point constant.

Where it is desired to change the consistency of the stock flowing on to the Fourdrinier wire, for instance in order to change the drainage rate on the wire, while still keeping the pulp tonnage rate constant, the operator can introduce a correction to the consistency set point on controller 70. The product controller 73 thereupon, in order to carry out the requirement of keeping Q×C constant, will generate a signal to flow controller 72 to change the setting of flow rate Q. Both controllers will act to adjust the consistency and flow rate to their new set points. Conversely, it is possible to effect a correction to the tonnage rate while holding the consistency constant, e.g. in the case where it is desired to speed up the Fourdrinier wire but maintain the same thickness of the web. For this purpose one can manually increase the product Q×C setting in direct relation to the increase in wire speed, while holding the set point of consistency constant.

The selection of suitable components and instrumentation for these various control means depends on the degree of automation desired, and for the purposes of the instant invention are believed to be amply illustrated by the foregoing diagram and description of the rules of logic by which the system operates.

As one specific example, one can employ a consistency controller and product controller that have manual set points of C and C×Q respectively, with no manual set point for Q. The consistency controller can comprise the "Barton 273 A" cell and the "Foxboro Stabilog Controller" mentioned above. The flow meter 71 can then comprise a magnetic flow meter such as the "Foxboro Magnetic Flow Meter System" manufactured by The Foxboro Company of Foxboro, Massachusetts, in conjunction with a flow controller 72 such as the "Magnetic Flow Dynalog Instrument 9600 C Series" manufactured by the Foxboro Company.

The product controller 73 can comprise an analog computing station such as the "46 Series," and an "M 59" controller, both manufactured by the Foxboro Company.

With this arrangement the index indicators or set points of the consistency and flow controllers 70 and 72 are mechanically linked to pneumatic transmitters which transmit pneumatic signals to the computer. The computer produces a pneumatic signal which is proportional to the product of the two pressure inputs, which is applied to the controller. The controller compares this product signal to its set point and generates a signal dependent upon whether the product signal is less or greater than the set point. This signal is fed back to the flow controller and by an appropriate piston or bellows arrangement causes the set point of the flow controller to be correspondingly adjusted. Needless to say, numerous other specific components can be employed to carry out similar functions.

More generally, it will be apparent to those skilled in the art that many variations of the present invention are possible without departing from the true spirit and scope thereof.

What is claimed is:

1. A viscosity sensing device for use with a flow system, said sensing device comprising a stationary closed vortex chamber of substantially circular cross-section, said chamber adapted to contain liquid under pressure; inflow means adapted to introduce pressurized liquid into said chamber and to create a circular flow therein; an outlet spaced from said inflow means; said inflow means, said vortex chamber, and said outlet constructed and arranged to produce a vortex of substantial radial thickness of said liquid in contact with the wall of said chamber from said inflow means to said outlet; a sensing means exposed directly to liquid in said vortex chamber at a predetermined radially localized sensing point spaced upstream from said outlet, said sensing means adapted to be responsive to the dynamic condition of liquid at said radially localized point, said dynamic condition at said radial point being dependent upon the shear stress between radially adjacent liquid elements in said vortex chamber.

2. The viscosity sensing device of claim 1 wherein said sensing means comprises a liquid pressure sensing means.

3. The viscosity sensing device of claim 2 wherein said liquid pressure sensing means is located at a predetermined point within said chamber where static liquid pressure increases with increase in viscosity.

4. The viscosity sensing device of claim 3 wherein said pressure sensing means is located in the vicinity of said inflow means and substantially closer to the axis of said chamber than to its walls.

5. The viscosity sensing device of claim 2 wherein said pressure sensing means is located at a predetermined point within said chamber where static pressure decreases with increase in viscosity, said pressure sensing means spaced radially from the axis of said chamber.

6. The viscosity sensing means of claim 5 wherein said pressure sensing means is adapted to sense positive pressure in excess of 10 p.s.i. gauge.

7. The viscosity sensing device of claim 2 wherein a second sensing means is exposed to sense liquid pressure at a predetermined second point in said flow system, and a pressure differential means adapted to respond to difference in pressure between said two predetermined points.

8. The viscosity sensing device of claim 7 wherein said first point is predetermined within said vortex so that pressure thereat increases with increase in viscosity and said second point is predetermined within said flow system so that pressure thereat decreases with increase in viscosity.

9. The viscosity sensing device of claim 8 wherein said second point is located within said vortex chamber at a predetermined second radially localized position spaced from said first point and spaced upstream from said outlet.

10. The viscosity sensing device of claim 2 wherein said pressure sensing means is incorporated in a curved member disposed in said vortex chamber, the curve of said member being substantially aligned with the direction of flow in a manner to permit substantially smooth flow thereby and said pressure sensing means being directed substantially perpendicular to the direction of flow.

11. The viscosity sensing means of claim 10 wherein said curved member comprises a streamlined member protruding inwardly from the wall of said chamber, said streamlined member located between said inflow means and said outlet, and having its axis disposed at an angle relative to the radius of said chamber into substantial alignment with liquid flow therethrough.

12. The viscosity sensing means of claim 10 wherein said curved member comprises a tubular member extending into said chamber in substantial axial alignment therewith, a passage in said member extending at a substantial angle to the direction of flow within said chamber, defining said sensing location at a point spaced from the axis of said chamber.

13. The viscosity sensing device of claim 1 wherein said inflow means comprises a tangential inlet in combination with a pump adapted to produce a pressure drop across said device in excess of about 10 p.s.i.

14. The viscosity sensing device of claim 1 wherein said inflow means includes a tangential inlet located adjacent one end of said vortex chamber, said outlet comprising an opening located at the opposite end of said chamber and serving as the only egress for liquid from said chamber.

15. The viscosity sensing device of claim 1 wherein said chamber is axially elongated, and said sensing means is located closer to said inflow means than to said outlet.

16. In a viscosity sensing device for use with a flow system comprising a vortex chamber of substantially circular cross-section, said chamber adapted to contain liquid under pressure; said chamber having an end of a given diameter; a tangential inlet located immediately adjacent said end; an outlet spaced from said inlet a distance substantially greater than said given diameter; means for connecting a conduit to said outlet to convey stock from said chamber; and at least one liquid pressure sensing means exposed to the interior of said chamber at a point located between said inlet and said outlet, substantially in advance of said outlet.

17. The viscosity sensing device of claim 16 wherein said pressure sensing means lies at a predetermined point spaced a distance no greater than about twice said first diameter along the axis of said chamber from said inlet towards said outlet, said sensing means being at least closely adjacent to said axis, and lying in a region where an increase in pressure indicates an increase in viscosity.

18. The viscosity sensing device of claim 16 wherein said pressure sensing means lies at a predetermined point spaced substantially from the axis of said chamber and located in a region where an increase in pressure indicates a decrease in viscosity.

19. A viscosity sensing device for use with a flow system, the sensing device comprising a closed vortex chamber of substantially circular cross-section, said chamber adapted to contain liquid under pressure; inflow means adapted to introduce pressurized liquid from a flow line into said chamber and to create circular flow in said chamber, outlet means for returning said liquid from said chamber to said flow line, and a pump adapted to maintain a substantially constant pressure drop between the inlet and outlet of said vortex chamber; said inflow means, said vortex chamber, and said outlet constructed and arranged to produce a vortex of substantial radial thickness of said liquid in contact with the wall of said chamber from said inflow means to said outlet; a sensing means comprised of two sensors and means for measurement of differential response between said sensors, said sensors exposed directly to liquid in said vortex chamber at predetermined radially localized sensing points spaced radially from each other and each upstream from said outlet and adapted to be responsive to the dynamic condition of liquid at said radially localized points, said dynamic condition at said radial points being dependent upon the shear stress between radially adjacent liquid elements in said vortex chamber, a first of said points located at a predetermined point within said chamber where static liquid pressure increases with increase in viscosity and the second of said points located at a predetermined point within said chamber where static liquid pressure decreases with increase in viscosity.

References Cited

UNITED STATES PATENTS

| | | | |
|---|---|---|---|
| 2,233,561 | 3/1941 | Kalle | 73—54 |
| 2,716,337 | 8/1955 | Fontein | 73—54 |
| 3,017,767 | 1/1962 | Mossberg | 73—54 |
| 3,319,471 | 5/1967 | Hermann. | |

LOUIS R. PRINCE, Primary Examiner

J. W. ROSKOS, Assistant Examiner

U.S. Cl. X.R.

162—263